June 9, 1964 R. G. HAAGENS 3,136,163
VISCOSITY COMPENSATOR FOR FLUID DAMPING DEVICES
Filed Sept. 18, 1961 3 Sheets-Sheet 1

INVENTOR.
ROBERT G. HAAGENS
BY Kenway, Jenney & Hildreth
ATTORNEYS

*INVENTOR.*
ROBERT G. HAAGENS
ATTORNEYS

United States Patent Office 3,136,163
Patented June 9, 1964

3,136,163
VISCOSITY COMPENSATOR FOR FLUID
DAMPING DEVICES
Robert G. Haagens, Walpole, Mass., assignor to Northrop
Corporation, Beverly Hills, Calif., a corporation of
California
Filed Sept. 18, 1961, Ser. No. 138,888
10 Claims. (Cl. 74—5.5)

This invention relates to fluid damping devices, and more particularly to an improved viscosity compensator for maintaining a uniform damping effect in such a device, compensated for variations in the viscosity of a damping fluid over a wide range of temperatures.

This invention finds particular application in a damping device of a type disclosed by United States Patent No. 2,864,256 to Robert G. Haagens and Edward L. Swainson, issued December 16, 1958, but has broad utility for compensating damping devices of the general type in which a fluid impeller drivingly connected with a mass to be damped operates in a passage containing damping fluid, in which the passage is valved to vary its flow resistance by means responsive to the temperature or volume (which are correlatives of the viscosity) of the damping fluid, for maintaining a uniform damping effect through a range of temperatures over which the fluid viscosity varies widely. The aforementioned patent shows a viscosity compensator comprising an expansible bellows filled with damping fluid and connected to reciprocate a plunger; slidable shutters and the plunger are formed with co-acting cam surfaces for sliding the shutters to valve the fluid passage, in which the impeller operates, as a function of the correlative values of temperature, specific volume, and viscosity of the damping fluid.

The most perplexing problem encountered is that which arises from the fact that the viscosity of fluids, such as silicone oils, varies with changes in ambient temperature. In the absence of means responsive to temperature changes for varying the amount of damping, the damping force will be found to be very high at low temperatures and to fall off rapidly with an increase in temperature, through a curve of non-linear configuration. Therefore in order to provide a system in which the damping force is constant it is necessary to make use of means for introducing into the system a controlled damping effect which varies in the opposite direction to the variation of the "natural" damping force and through a curve which is the reciprocal of the curve of variation of the natural damping force, the result being that for all temperatures the damping effect will be uniform.

The damping device of the aforementioned patent is limited, at the lower end of its operative temperature range, in its ability to compensate fully for the very rapid rate of change of viscosity of ordinary damping fluids, because an extremely small cam angle is required between the slidable shutter and the bellows-connected plunger, and mechanical jamming may result. The small cam angle is necessary in view of the relatively high rate of change of viscosity with respect to temperature at the cold end of the operative temperature range. By the "cam angle" is meant the vertical angle of the shutter cam surface, measured from a plane parallel to its direction of sliding motion. I have found in practice that a damping device as described by the aforementioned patent, which is designed to provide uniform damping in the temperature range of approximately —30° F. to +190° F., cannot satisfactorily operate in a lower range extending down to approximately —65° F., which is frequently encountered in military and commercial use of gyroscopes or similar instruments. This limitation arises from a practical minimum shutter cam angle of about 29°, below which there is danger of mechanical jamming with the plunger.

It is an object of this invention to provide an improved fluid damping device having viscosity-compensating means which are effective to maintain a uniform damping effect over an increased temperature range.

It is a further object of the invention to provide improved viscosity-compensating means for regulating a damping device of the kind in which a fluid-filled passage encloses an impeller, and which includes movable shutters for valving the passage to vary its effective volume and thus control the damping effect of the fluid against angular displacement of the impeller.

Further objects and advantages of the invention will become apparent as the following description proceeds.

According to a feature of the invention, a reciprocable plunger is mounted in an expansible bellows assembly comprising a first fluid-filled bellows having a relatively small effective area and low spring constant, and a second fluid-filled bellows having a relatively large effective area and high spring constant. The first bellows opens rapidly upon a temperature increase through the lower end of the operative temperature range, to produce relatively rapid motion of the plunger. The second bellows exhibits very little expansion during the initial temperature rise, but in a higher temperature range in which the first bellows has fully expanded and has come to rest against a stop carried by the second, slow-acting bellows, continues to move the plunger at a relatively slow rate with respect to increase of temperature. The plunger, in a preferred embodiment, is formed with a cam surface which co-acts with cam surfaces of slidable shutters to valve a fluid-filled passage in which a damping impeller connected to the mass to be damped is rotatably received. Alternatively, the plunger may itself act as valving means, or may actuate other well-known forms of valving means.

The required shutter displacement is a function of the change in temperature of the fluid, as related to the shutter cam angle and the physical position of that bellows which is operating in a given temperature range. The physical position of the bellows under given conditions is related to the effective diameter and spring constant of that bellows. Therefore, the shutter cam angle can be substantially increased over that portion of the cam surface which is operative during movement of the first bellows, in view of the smaller effective area and lower spring constant of that bellows, which results in an increased rate of plunger movement with respect to temperature. A uniform damping effect may be secured over the extended temperature range by properly selecting the physical constants of the two bellows and the form of the shutter cam surfaces. The increased effective area of the slow moving second bellows, in addition, has been found in practice to extend the temperature range of this instrument to +250° F., thereby encompassing damping control to close tolerances from —65° F. to +250° F.

While the specification concludes with claims particularly pointing out the subject matter of the invention, it is believed that a clearer understanding will be gained from the following detailed description of a preferred embodiment, referring to the accompanying drawings, in which:

Figure 1:
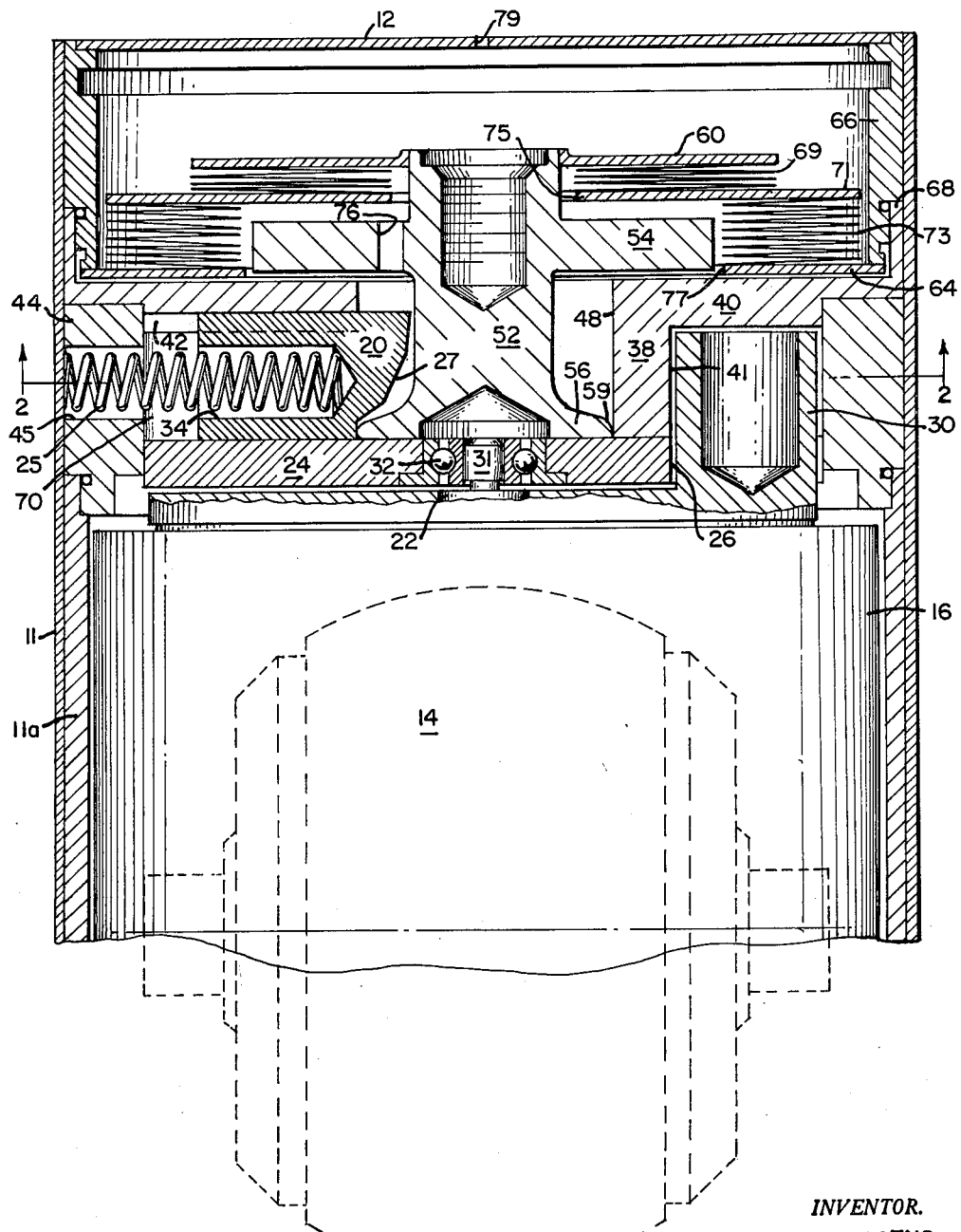
FIG. 1 is a view partly in section of a damping device constructed in accordance with the invention.

By way of illustration, the improved viscosity compensator is shown in FIG. 1 in combination with a damping device which is a modified form of that disclosed by the aforementioned United States Patent No. 2,864,256. However, the viscosity compensator is readily adapted to achieve the objects of the invention in other fluid damping systems of the kind which utilize an impeller operating within a fluid passage valved by the control means to maintain a uniform damping effect over a range of correlated valves of temperature, volume, and viscosity of the damping fluid. Such a system is particularly useful in a gyroscope, but it will be apparent that it may be readily adapted for use in other instruments requiring damping of the movement of a mass.

The gyroscope and damping system are housed within a cylindrical metal casing 11, having an inner shell 11a. One end of the casing is enclosed by a flat metal disk 12. The elements of the gyroscope per se form no part of this invention and are merely indicated in FIG. 1 as including a spin motor assembly 14 and an enveloping gimbal structure, which includes an inner cylindrical casing 16 formed as a cup and provided at its center with a recess receiving a bushing 22 carrying a pivot pin 31 concentric with the casings 11 and 16.

Projecting upwardly from the casing 16 of the gimbal structure are a number of symmetrically disposed, radially extending, wedge-shaped segments 30, of which only one is shown in the drawings. These segments serve as vanes for the damping system and are rotated as an impeller in response to the action of the spin motor 14 within the casing 16.

Figure 3:
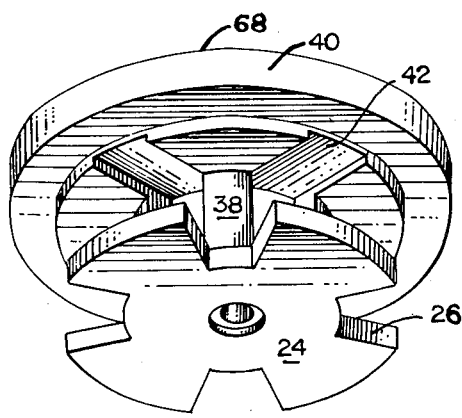
FIG. 3 is a pictorial view of a damper body assembly forming a portion of the device.

Superposed on the casing 16 is a damper body assembly shown in greater detail in FIG. 3, which includes a flat disk 24 provided with a number of large, wedge-shaped recesses or slots 26 disposed symmetrically about the center of the disk 24 and dimensioned to fit over the impeller vanes 30 closely but with clearance in the radial direction. The wedge-shaped slots are made wide enough to permit relative rotation of the impeller vanes 30 with respect to the disk 24 through approximately 8 degrees. At the center of the disk 24 there is provided a bearing 32 cooperating with the pivot pin 31 to maintain concentricity of casing 16 and vanes 30 with respect to disk 24.

Secured to the disk 24 is a damper body 38, comprising a flat annular upper plate portion 40 slotted to form guideways or tracks 42 as radial slots in the bottom surface of the annular portion, and arranged radially and symmetrically about the axis of the annular portion.

Figure 2:
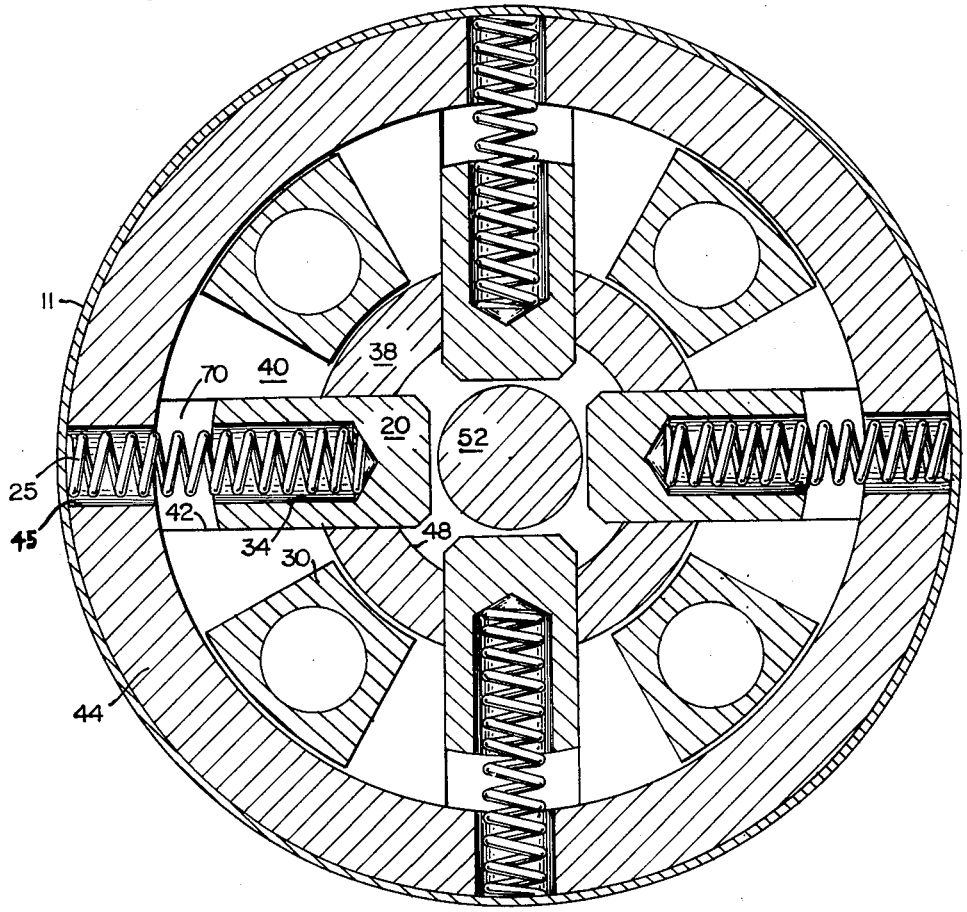
FIG. 2 is a sectional view taken along line 2—2 in FIG. 1, looking in the direction of the arrows.

Mounted to slide in the tracks 42 are shutter block 20, as shown in FIGS. 1 and 2. The inner end of each block 20 is carefully profiled, as shown at 27, to form a cam surface having a configuration related in a manner to be more fully explained hereinafter to the curve of damping force variation found suitable for the particular instrument. Each of the blocks 20 is provided with a hole 34 bored from the rear surface of the block and serving to receive one end of a helical spring 25 arranged to urge the block inwardly along the track 42 toward the center of the disk 24. The tracks 42 receive and guide the blocks 20, which function as valve shutters in the damping system. It should be noted that the vanes 30 form with the body 38 four chambers each of which is divided in two by the shutters 20, the two parts of each chamber being in communication through passages 70 formed by the outer ends of the shutters and a ring 44, which ring also receives and locates the outer end of each spring 25 in a hole 45. In other words the shutters serve as slidable partitions sub-dividing each chamber. The radial position of each shutter 20 determines the cross-sectional area of the passage between the adjacent chambers.

The body 38, together with disk 24, plate portion 40, and ring 44, form between them an annular channel 41 within which the vanes 30 are moved, the clearance between the vanes and the walls of the channel being of the order of .002" to prevent frictional contacts while minimizing leakage of fluid around the vanes. The specified clearance between the vanes and the inner and outer walls of the damping chamber is insured by the cooperating pivot pin 31 in bearing 32.

Extending through a center hole 48 of the body 38 is a vertical plunger 52 having a flange portion 54 and a lower mushroom-shaped head 56 having a smoothly rounded outer periphery 59 engaging the cam surfaces 27 of the shutters 20. At its upper end the plunger 52 is welded or otherwise secured to a flat metal plate 60 serving as the upper member of a flexible metal bellows assembly terminating at its bottom in a stout annular metal plate 64 welded to a relatively heavy metal annulus 66 mounted on a shoulder 68 formed about the periphery of the body 38.

Figure 5:
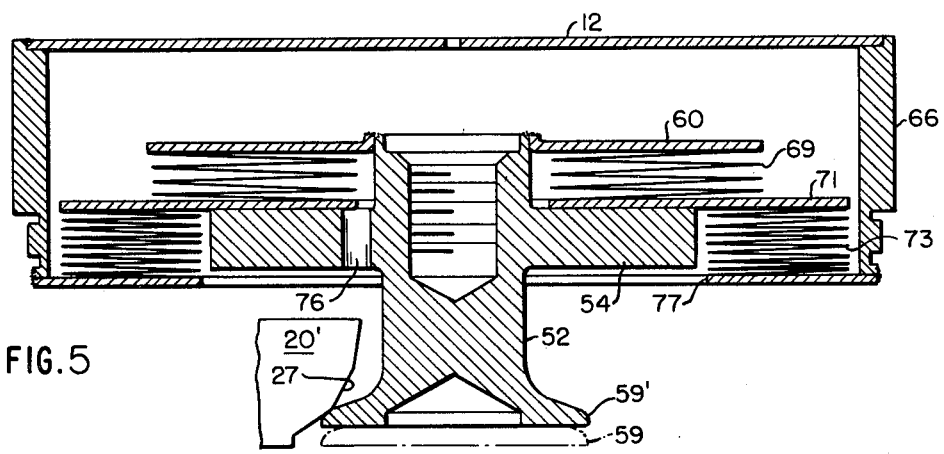
Figure 6:
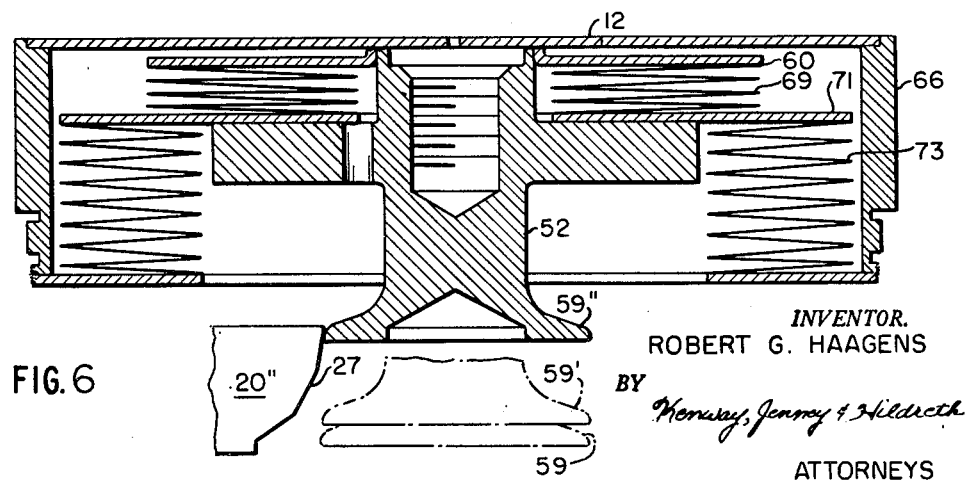

According to a feature of the invention, the bellows assembly includes a first bellows 69 sealingly secured to the lower face of the plate 60 and to the upper face of a separation plate 71 of somewhat larger cross-sectional area, and a second bellows 73 which is in turn sealingly secured between the separation plate 71 and the plate 64. The first bellows 69 is selected to have a small effective area and low spring constant relative to the second bellows 73. The factors involved in the selection of the relative values of the physical constants of the two bellows will be more fully explained hereinafter. The separation plate 71 is formed with a central opening 75 forming a clearance about the plunger 52, but of smaller diameter than the flange 54 of the plunger, so that the separation plate will seat thereon upon full expansion of the bellows 69, as shown in FIGS. 5 and 6. An opening 76 is formed through the flange 54 to insure fluid communication between the first bellows and the previously-described fluid-filled passage of the damping device. Further, the plate 64 is formed with a central opening 77 affording a clearance about the flange 54 to establish fluid communication with the interior of the second bellows 73.

It will be understood that the space between the casings 11a and 16 is filled with liquid and also all of the space above the casing 16, except for the space between the plate 60 at the upper portion of the bellows assemblies and the plate 12 at the top of the casing 11. Here it should be stated that the expressions "upper" and "lower" as used herein, refer to the orientation of the device as shown in FIG. 1, and has no connotation with respect to the position of the device in use. An air-relief opening 79 is formed in the plate 12 for free operation of the bellows.

In the operation of the device, the gyroscope 14 will be subjected to certain input rates which cause limited rotation of the gimbal structure, including the vanes 30. As hereinbefore stated, the device permits rotation of the vanes 30 through about 8 degrees within the recesses 26 of the plate 24. The movement of the vanes 30 impels a flow of fluid from one of the chambers adjacent each vane to the other, according to the direction of movement of the vanes. The fluid must flow through the orifices 70 at the outer end of each shutter 20 and the effective resistance to the flow is, of course, a function of the radial position of the shutters. Here it should be emphasized that in any device operated for movement in a fluid there will be a considerable degree of what may be termed "natural" damping, inherent in the nature of the structure. The natural damping varies widely with the viscosity of the fluid, thus introducing an error due to temperature variations. The object of the device therefore is to introduce a compensating effect which varies in an equal but opposite manner from the variation of the natural damping force, the result being that at all temperatures the damping force is the same. The "natural" damping force is high at low temperatures and vice versa; the value of the natural damping force follows a steep, non-linear curve. Hence the value of the compensating effect must follow the reciprocal curve.

The bellows assembly, by reason of its resilience, conforms in volume to the volume of fluid within it. As the temperature of the liquid in the system increases, the fluid expands, and the volume of the bellows also increases to take up the fluid expansion, causing the plunger to move upwardly and thus move each of the shutters 20 outwardly from the center of the device toward the periphery, thus reducing the cross-sectional areas of the orifices 70 through which the liquid flows in response to the rotation in either direction of the vanes 30. The function of the springs 25 is merely to urge the shutters inwardly into operating contact with the cam surface 59 of the plunger head 56.

Figure 4:
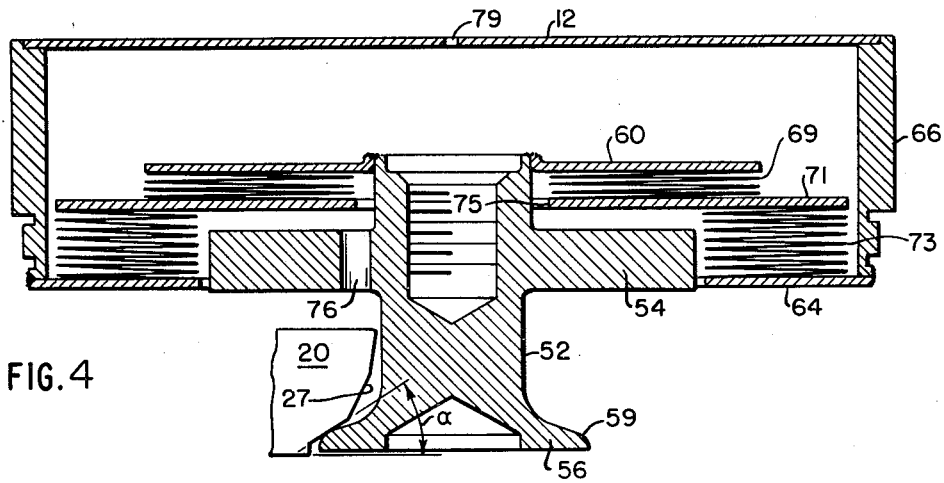
FIGS. 4, 5, and 6 are sectional views in elevation showing various positions of the improved viscosity-compensating means in various portions of the operative temperature range.

Since the movement of the shutters outwardly increases the value of the compensating damping effect introduced into the system, it follows that the outward movement of the shutters in response to increase in temperature must be proportional to the desired curve of increase in the value of the compensating damping effect. This curve is the reciprocal of the curve relating the viscosity of the damping fluid to its temperature. The viscosity decreases at a decreasing rate with respect to rising temperature; therefore, in the extreme low temperature of the designed operating range, the bellows must open very rapidly with respect to increasing temperature. In this range, the bellows are initially closed as shown in FIG. 4, and the cam surface 59 cooperates with a portion of the shutter cam surface 27 having a minimum cam angle α. As the temperature of the fluid increases through a lower range, for example −65° to −20° F., the bellows 73 expands relatively little, but the bellows 69 expands quite rapidly with respect to the temperature increase, because of its small effective area and lower spring constant. Since the shutter displacement is a function of the change in temperature, as related to the cam angle α and the physical position of the bellows, (the latter being, under given conditions, related to the effective diameter and spring constant of that bellows), the initially rapid shutter movement required is obtained through the effect of the low spring constant and small effective area, permitting the minimum cam angle α shown in FIG. 4 to be made adequately large to prevent any possibility of mechanical jamming between the plunger 52 and the shutter 20. The use of the bellows 69 therefore makes it mechanically feasible to operate the damping device through a lower range of temperatures than would be feasible with a single bellows, such as disclosed in the aforementioned U.S. Patent No. 2,864,256.

Upon full expansion of the bellows 69 at the upper limit of the lower temperature range, the flange 54 of the plunger abuts the lower surface of the separation plate 71, as shown in FIG. 5, to prevent further expansion of this bellows. As this point is reached, the cam surface of the plunger reaches an intermediate position 59' at which the cam angle of the surface 27 of the shutter increases to maintain a desired rate of shutter displacement, in cooperation with the subsequent expansion of the larger bellows 73, which takes place at a reduced rate relative to the previous expansion of the bellows 69, in a higher temperature range, because of the greater spring rate and larger effective area of the larger bellows 73. The shutter has reached a position 20' at this transition stage.

Further expansion of the fluid through a higher temperature range, which may illustratively extend from approximately −30° to +250° F., causes the bellows 73 to expand to further increase the damping effect as the fluid viscosity decreases, until the upper end of the temperature range is reached (250° F.). In this position, the cam surface of the plunger has attained a position 59", in which it co-acts with the upper portion of the cam surface 27 to extend the shutter to a position 20" of maximum damping effect (see FIG. 6).

In consequence of the difference in the rates of motion of the two bellows, the cam surface 27 on the inner ends of the shutters does not take the precise form of the inverse curve of the viscosity-temperature relation; rather, the initial portion is defined by a minimum angle α such that its slope is greater than that of the inverse curve.

In practice, I have found that a satisfactory viscosity-compensator for operation in a lower temperature range of −65° to approximately −30° F., and an upper range extending to +250° F., may afford uniform damping in a miniature gyroscope by utilizing this double stroke bellows design.

Of course, the shutters must be selected for a given application in relation to the correlative viscosity-temperature-volume characteristics of the desired damping fluid, and with regard to the design specification of the instrument, as will be understood by those skilled in the art. I have found that a larger cam angle than the minimum allowable angle of 29° is satisfactory in the improved device. The minimum allowable angle to prevent jamming restricts a viscosity compensator having a single bellows, as described by the aforementioned U.S. Patent No. 2,864,256, from operating satisfactorily at temperatures below approximately −30° F.

What I claim and desire to secure by Letters Patent of the United States is:

1. For use in a device for damping the movement of a mass, of the kind which comprises a casing containing the movable mass to be damped and forming a fluid-filled passage, and a fluid impeller disposed within said passage for rotary driving connection with the mass; compensating means for regulating the damping effect at a uniform value through a range of values of fluid viscosity non-uniformly variable with respect to fluid temperature, comprising a shutter movably mounted to valve said passage, a plunger, said shutter and said plunger being formed with co-acting cam surfaces in contact with one another, a first expansible-chamber device having a relatively low spring rate and relatively small effective area, and a second expansible-chamber device having a relatively high spring rate and relative large effective area, said expansible-chamber devices being adapted to be filled with fluid and being mutually drivingly connected with said plunger for reciprocation thereof by said first device at a relatively rapid rate with respect to changes in temperature of fluid contained therein through a lower temperature range and by said second device at a relatively slow rate with respect to changes in temperature of fluid contained therein through a higher temperature range.

2. For use in a device for damping the movement of a mass, of the kind which comprises a casing containing the movable mass to be damped and forming a fluid-filled passage, and a fluid impeller disposed within said passage for rotary driving connection with the mass; compensating means for regulating the damping effect at a uniform value through a range of values of fluid viscosity non-uniformly variable with respect to the fluid temperature, comprising a shutter movably mounted to valve said passage, a plunger, said shutter and said plunger being formed with co-acting cam surfaces in contact with one another, a first bellows having a relatively low spring rate and relatively small effective area expansibly connected between said plunger and a separation plate, and a second bellows having a relatively high spring rate and relatively large effective area, said second bellows being expansibly connected between said separation plate and said casing, said bellows being adapted to be filled with fluid for reciprocation of said plunger by said first bellows at a relatively rapid rate with respect to changes in temperature of fluid contained therein through a lower temperature range and by said second bellows at a relatively slow rate with respect to changes in temperature of fluid contained therein through a higher temperature range.

3. Fluid damping apparatus for an instrument having at least a movable mass, comprising a container housing said movable mass and a quantity of fluid, expansible-chamber means for varying the size of said container to accommodate volumetric changes in said fluid due to changes in temperature, vanes attached to said mass for movement within said container, means forming variable orifices within said container, and means actuated by said expansible-chamber means for varying the size of said orifices, rotational movement of said movable mass causing said vanes to force said fluid to flow through said variable orifices, said expansible-chamber means including a first portion having a relatively small effective area, and a second portion having a relatively large effective area, for varying the size of said orifices at a relatively rapid rate with respect to changes in temperature of said fluid through a lower temperature range and at a relatively slow rate with respect to changes in temperature of said fluid through a higher temperature range.

4. A fluid temperature-responsive device comprising a casing, a plunger element slidably mounted in said casing, a first bellows having a relatively low spring rate and relatively small effective area drivingly engaged at an end thereof with said plunger, a second bellows having a relatively high spring rate and relatively large effective area drivingly engaged at opposite ends thereof to said casing and the other end of said first bellows, said first and second bellows being adapted to be filled with thermally-expansible fluid, such that said plunger is actuated through a lower temperature range by said first bellows at a relatively rapid rate with respect to changes in temperature of said fluid, and through a higher temperature range by said second bellows at a relatively slow rate with respect to changes in the temperature of said fluid, said plunger being formed with a flange engaging said other end of said first bellows at a transition temperature between said lower and said upper temperature ranges to limit expansion of said first bellows.

5. A fluid temperature-responsive control device comprising a casing, a plunger, a control member having a cam surface slidably mounted in said casing, said plunger being formed with a cam surface in driving contact with said cam surface of said member, a first bellows having a relatively low spring rate and relatively small effective area secured at one end thereof to said plunger, a separation plate secured to the other end of said first bellows, a second bellows having a relatively high spring rate and relatively large effective area secured at opposite ends thereof to said casing and said separation plate, respectively, said bellows being adapted to be filled with thermally-expansible fluid whose viscosity varies with temperature, such that said plunger is driven to actuate said control member through a lower temperature range by said first bellows at a relatively rapid rate with respect to changes in temperature of said fluid, and through a higher temperature range by said second bellows at a relatively slow rate with respect to changes in the temperature of said fluid.

6. A control device as recited in claim 5, in which said plunger is formed with a flange engaging with said separation plate at a transition temperature between said lower and said upper temperature ranges to limit expansion of said first bellows.

7. A device for damping the movement of a mass, comprising a casing containing the mass to be damped, walls forming a passage within said casing, fluid filling said casing and passage, a fluid impelling member disposed in the fluid and connected for movement with the mass without touching the casing, a shutter mounted to slide within said casing to valve said passage, a plunger mounted for reciprocation within the casing, the shutter and plunger having co-acting cam surfaces in contact one with another whereby movement of the plunger causes the shutter to slide, a first bellows having a relatively low spring rate and relatively small effective area, and a second bellows having a relatively high spring rate and relatively large effective area, said bellows being filled with said fluid and being mutually drivingly connected with said plunger for reciprocation thereof by said first bellows through a lower temperature range and by said second bellows through a higher temperature range.

8. A device for damping the movement of a mass, comprising a casing containing the mass to be damped, walls forming a passage within said casing, fluid filling said casing and passage, a fluid impelling member disposed in the fluid and connected for movement with the mass without touching the casing, a shutter mounted to slide within said casing to valve said passage, a plunger mounted for reciprocating within the casing, the shutter and plunger having co-acting cam surfaces in contact one with another whereby movement of the plunger causes the shutter to slide, a first bellows having a relatively low spring rate and relatively small effective area expansibly connected between said plunger and a separation plate, and a second bellows having a relatively high spring rate and relatively large effective area, said second bellows being expansibly connected between said separation plate and said casing, said bellows being adapted to be filled with said fluid for reciprocation of said plunger by said first bellows at a relatively rapid rate with respect to changes in temperature of said fluid through a lower temperature range and by said second bellows at a relatively slow rate with respect to changes in temperature of said fluid through a higher temperature range.

9. A control device as recited in claim 8, in which said plunger is formed with a flange engageable by said separation plate at a transition temperature between said lower and said upper temperature ranges to limit expansion of said first bellows.

10. Apparatus for providing constant damping of a gyroscope having at least a gimbal rotatable in a cylindrical housing comprising a plurality of vanes attached to said gimbal, each being disposed along a radius, and adjacent the inner wall of said cylindrical housing, a like plurality of shutters radially slidable in said housing and interposed between said vanes, the outermost ends of said shutters defining with an inner wall of said housing openings of variable size, an expansible bellows assembly sealed to said housing and communicating with the interior thereof, a damping fluid substantially filling said housing and said bellows, and a plunger, said plunger being formed with a cam surface in driving contact with said shutters; said bellows assembly comprising a first bellows having a relatively low spring rate and relatively small effective area secured at an end thereof to said plunger, a separation plate secured to the other end of said first bellows, and a second bellows having a relatively high spring rate and relatively large effective area secured at opposite ends thereof to said housing and said separation plate; such that said plunger is driven, to actuate said plurality of shutters to vary the size of said openings, through a lower temperature range by said first bellows at a relatively rapid rate with respect to changes in temperature of said fluid, and through a higher temperature range by said second bellows at a relatively slow rate with respect to changes in the temperature of said fluid.

References Cited in the file of this patent

UNITED STATES PATENTS

| | | |
|---|---|---|
| 2,864,256 | Haagens et al. | Dec. 16, 1958 |
| 2,932,203 | Peters | Apr. 12, 1960 |